United States Patent [19]
Mason et al.

[11] Patent Number: 5,553,418
[45] Date of Patent: Sep. 10, 1996

[54] DECREASED-TILT FLOWER POT DRAIN

[76] Inventors: Linda J. Mason; John P. Mason, both of 24 Woodland Rd., Stone Ridge, N.Y. 12484

[21] Appl. No.: 370,523

[22] Filed: Jan. 9, 1995

[51] Int. Cl.⁶ ................................................. A01G 31/02
[52] U.S. Cl. ........................................................ 47/79
[58] Field of Search ................................. 47/79 R, 79 I, 47/79 V, 81 R, 81 D

[56] References Cited

U.S. PATENT DOCUMENTS

| | | | |
|---|---|---|---|
| 1,383,368 | 7/1921 | Ambrose | 47/79 R |
| 4,527,354 | 7/1985 | Sellier | 47/81 R |
| 5,299,384 | 4/1994 | Andrews | 47/79 R |

FOREIGN PATENT DOCUMENTS

| | | | |
|---|---|---|---|
| 1581467 | 9/1969 | France | 47/81 D |
| 2102897 | 3/1972 | France | 47/81 D |
| 2255843 | 7/1975 | France | 47/81 R |
| 1301913 | 7/1992 | France | 47/81 R |

*Primary Examiner*—Henry E. Raduazo
*Attorney, Agent, or Firm*—Joseph B. Taphorn

[57] ABSTRACT

A drainage system for a closed-bottom tiltable flower pot employs a reservoir on the bottom of one side of the pot. A straight drain tube extends from the upper inner edge of the reservoir to the upper edge of the other or tilt-down side of the pot. An opening in the bottom of the reservoir only on the one or tilt-up side of the pot admits excess percolation water into the reservoir and allows trapping it on minimal tilting of the reservoir for flow out the drain tube. An air vent tube may be employed to free drainage from the reservoir on tilting. The drain tube may be utilized to water the flower pot by capillary action should surface watering be undesirable. A template or plastic strip may be incorporated for non-flat-bottomed odd-shaped and round-shaped pots, respectively.

26 Claims, 7 Drawing Sheets

DECREASED-TILT FLOWER POT DRAIN

FIELD OF THE INVENTION

This invention relates to flower pots drained by tilting, and more particularly to flower pots which require less tilting to drain them.

BACKGROUND OF THE INVENTION

Plants require water, and to this end the owners of flower pots holding plants periodically water them at the surface. Applying the correct amount of water to a flower pot is a near-to-impossible task, being impacted not only by the condition of the soil in the pot, but also by the particular plant's needs which may further vary by size, ambient temperature and humidity, etc. Applying too little water may result in wilting or other leaf defects such as brown spots, yellow spots and dry and brittle leaves, or even drying up of the plant, or at least stunting of its growth, or hurting its flowering as by bud drop. Applying too much water can result in unwanted flooding of household areas if flower pots with bottom drains are utilized, or in drowning or at least disease conditions such as crown or root rot or mildew, if bottom-drainless pots are utilized.

Applying even the right amount of water does not result in trouble free gardening. That is because watering from the top causes soil in a flower pot to harden or seem baked, thereby impeding the flow of water (percolation) to the bottom and around the roots of the potted plant. To minimize this problem, flower-pot constructions have been employed which enable capillary watering of the soil from the bottom. This has been done with both bottom-drain and bottom-drainless pots.

Bottom-drainless pots are preferred because of the reduced likelihood of unwanted flooding of household areas. Typically, a bottom-drainless pot is formed with a reservoir on the bottom, and tubes are employed to insert and/or remove water from the reservoir. Usually water is removed through the tubes by tilting the flower pot to where the water runs out through the drain tube under the influence of gravity.

Unfortunately, tilting a flower pot to drain a reservoir involves at least two risks. One is that loose soil in the top of the flower pot will roll out and fall in areas where it is not desired. The other is that the entire soil mass and plant will fall out of the pot as the pot is tilted to a point where the reservoir water runs out, a point at which the bottom side of the flower pot slopes downward and outward and the soil mass can slide down the slick side of the pot and onto the floor, injuring the plant in the process too.

PRIOR ART

Prior efforts at flower pot tilt drains include Hunter U.S. Pat. No. 352,247. Hunter employed a perforated interior wall for moistening and draining. The space between the inner and outer wall was deemed a reservoir, and a spout and an air vent were formed in the upper edge of the flower pot.

In Benning U.S. Pat. No. 1,117,474, a bottom-opening watering flower pot has an open reservoir with a drain and air-vent tube built into the side wall of the pot. Ambrose U.S. Pat. No. 1,383,368 employs a bottom reservoir supplied with water through a tube along the inside of the wall of the pot. White U.S. Pat. No. 2,519,166 utilizes a closed-at-the-top annular tank having a central well housing a cylindrical flower pot and with which its bottom communicates through inside openings for bottom watering; the tank being filled by removing the pot, inserting a breather tube through an inside opening, pouring into the well, removing the tube and temporarily plugging the opening as with a finger, emptying the well, and reinserting the pot. Hopkins U.S. Pat. No. 3,137,096 employs a flower pot liner perforated on the bottom and sitting on a bed of charcoal, and grooved on its sides to form channels for watering. Allen U.S. Pat. No. 4,175,356 shows use of an aerator tube to deliver air to the root system of a plant.

SUMMARY OF THE INVENTION

Accordingly, it is an object of the invention to provide a flower pot having a reservoir at its bottom which can be emptied by utilizing gravity without tilting to a point where the soil mass therein can slide out of the pot.

Another object of the invention is to provide a structure which can be installed into an existing flower pot to retrofit it with a reservoir at its bottom which can be emptied by utilizing gravity without tilting to a point where a soil mass thereover can slide out of the pot.

Still another object of the invention is to provide such a flower pot retrofit structure which is simple and inexpensive of construction, easily installed, and efficient in operation.

Yet another object of the invention is to provide such a flower pot retrofit structure which can be readily fitted to differently sized and shaped flower pots.

The objects of the invention are attained by mounting a bottom-opening reservoir on one side of the bottom of a flower pot, and extending a drain tube from the side of the reservoir near the other or tilt-down side of the bottom of the flower pot to the top of the other or tilt-down side of the flower pot. The soil mass of a flower pot is assisted in holding the reservoir on one side of the bottom of the flower pot by fitting a board or sheet to the bottom of the reservoir. The board also forms a horizontal extension on the other side (tilt-down side) of the reservoir. The bottom of the board or sheet is formed with protuberances to hold the board or sheet in spaced relation to the floor of the pot and facilitate water flow therebeneath to the opening in the reservoir for collection therein. The opening is on the one or tilt-up side of the bottom of the reservoir.

A feature of the invention is that an air vent tube for facilitating drainage of water from the reservoir may be combined with the drain tube from where it leaves the reservoir to where it reaches the top of the other side of the flower pot, to minimize impact on the landscape. Thus a groove is formed in the top surface of the reservoir to conduct the air vent tube safely from where it parts with the drain tube to where it enters the reservoir on the one or tilt-up side of the flower pot.

An advantage of the invention is that the reservoir and its associated materials may be fashioned from inexpensive materials such as plastic.

BRIEF DESCRIPTION OF DRAWINGS OF AN EMBODIMENT OF THE INVENTION

These and other objects, features and advantages of the invention will become apparent from a reading of the following specification when considered with the appended drawings of preferred embodiments of the invention wherein.

DETAILED DESCRIPTION OF PREFERRED EMBODIMENTS OF THE INVENTION

Figure 1:
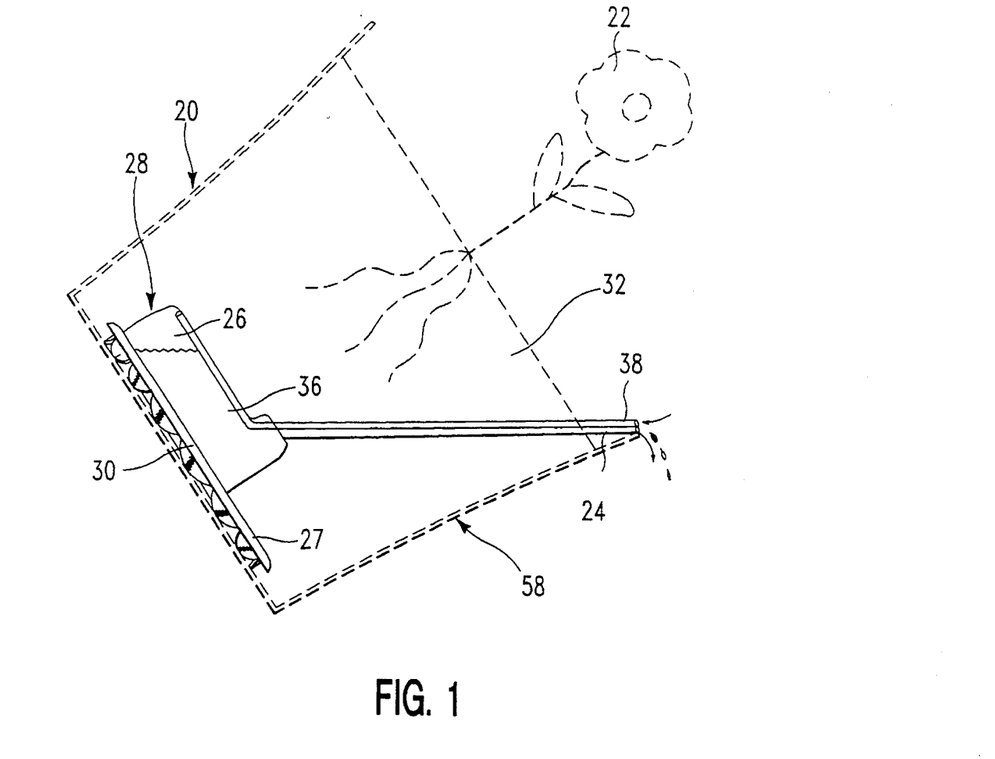
FIG. 1 is a diagrammatic side view of a reduced-tilt drained flower pot of the instant invention tilted to where a water reservoir therein is being drained.

Referring now mote particularly to the drawings, a flower pot in FIG. 1 embodying the invention and generally indicated by the numeral 20 and growing a rooted plant 22 is shown, partially tilted, in the drain position. In that position, a straight drain tube 24 is tilted to the horizontal position, or more, in which its free end at the lower upper edge of the pot is even with or below the inner fixed end of the tube where it is connected by suitable means such as a tight fitting opening or a spout, to the lower upper corner of the dome 26 of a reservoir generally indicated by the numeral 28 for communication therewith. The dome 26 has an aligning lateral extension 27 at its bottom edge on one side. The lower bottom end of the reservoir 28 may be sealed off by a floor integral with the dome 26, or as shown in greater detail in FIG. 2, by a board 30 suitably secured in the bottom of the dome 26 and extending under the extension 27 of the dome 26 in the tilt-down direction. As best seen in FIG. 1, the extension of the board 30 provides the strength to position and retain the reservoir 28 on the high or tilt-up side of the bottom of the tilted pot 20; the potted soil mass 32 materially assisting in keeping the reservoir there during draining operations.

Figure 2:
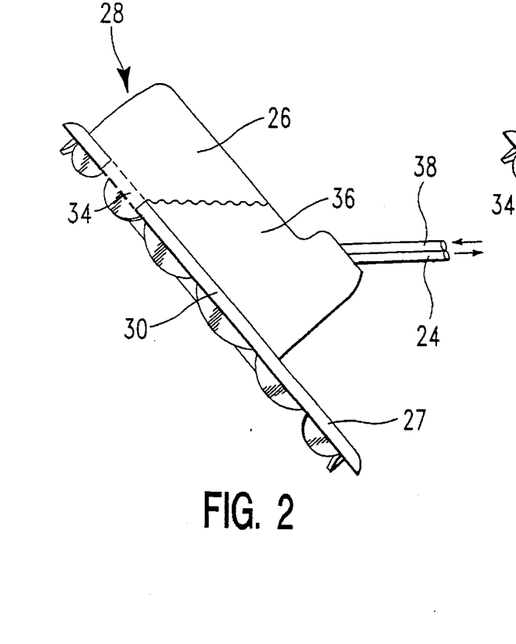
FIG. 2 is an enlarged diagrammatic side view of the tilted water reservoir of FIG. 1 and showing both the water filler and drain tube and the air vent tube and a board for holding the dome of the reservoir on one side of the bottom of the flower pot.

As shown in FIG. 2, the board 30 near the upper lower edge of the tilted reservoir dome 26, is formed with an opening 34 to allow excess water in the bottom of the flower pot 20 to enter the reservoir dome 26. The board 30 is secured to the dome 26 so as to seal the lower portion of the reservoir upon flower pot tilting and hold captured water 36 inside the reservoir dome when the pot is tilted for draining the reservoir via the tube 24.

Figure 3:
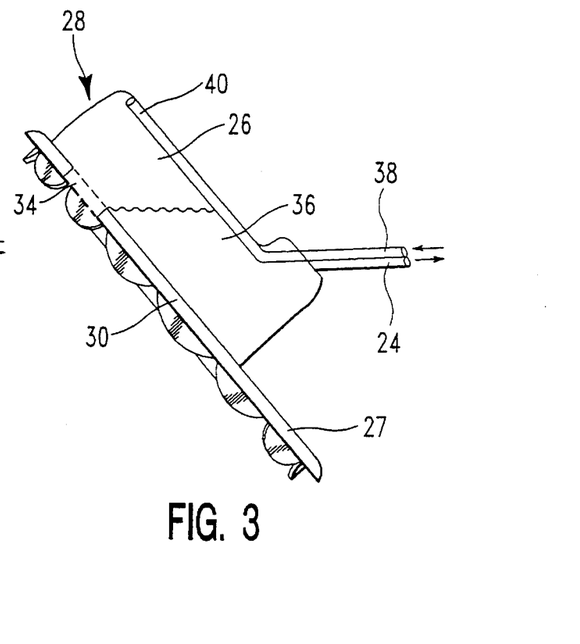
FIG. 3 is another enlarged diagrammatic side view of the tilted water reservoir of FIG. 1 and showing the air vent tube lying in a groove across the top reservoir dome.

As shown in FIG. 3, an air inlet tube 38, bonded to the drain tube 24 from the dome 26 to their free ends at the lower upper edge of the pot 20, splits therefrom at the dome 26 and extends across the top of the dome in a groove 40 in the upper surface thereof. It terminates at the higher upper edge of the dome 26 where it communicates with the interior of the dome to provide any air needed to replace water 36 being drained on tilting of the pot 20. The amount of air needed will vary with the texture of the potting material 32: a loose porous material like moss or tree fern may allow sufficient air to enter through the lower opening 34. The groove 40 provides some protection to the tube 38 lying therein when the soil mass is disturbed for some reason.

Figure 4:
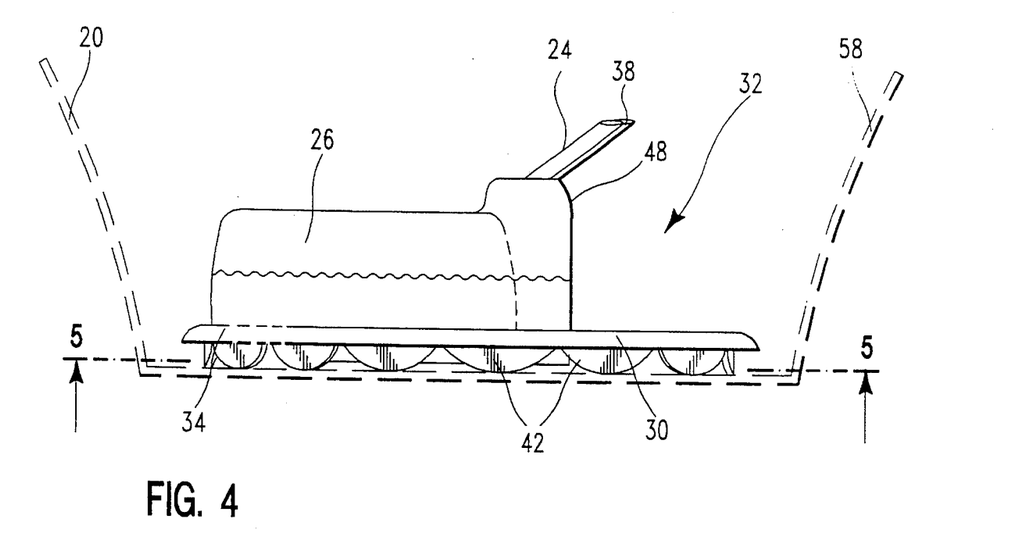
FIG. 4 is an enlarged diagrammatic side view of the reservoir of FIG. 2 non-tilted and showing feet on the bottom of the board to facilitate water flow to and from the reservoir dome water entry hole.

FIG. 4 shows the reservoir board 30 provided about its perimeter with a recess from which feet 42 depend. The feet 42 elevate the board 30 so that water may readily flow underneath it to reach the reservoir opening 34. The feet are so spaced from each other as to filter out loose dirt from the soil mass 32 that may be floating in the water. The recess may obtain under the full board extension.

It will be appreciated that the fixed end of the drain tube 24 on the dome 26 must be properly aligned with the extension of the board 30 to provide maximum drainage with the least tilting when seated in a flower pot: that is, the lower upper edge of the dome, with which the drain tube communicates, should be as far from the tilt down side of the flower pot as possible, which disposition is achieved when the drain tube connection with the dome 26 and the extension of the board 30 are in alignment as well as the length of the straight drain tube 24, and the pot is tilted down in the direction of the drain tube.

Figure 5:
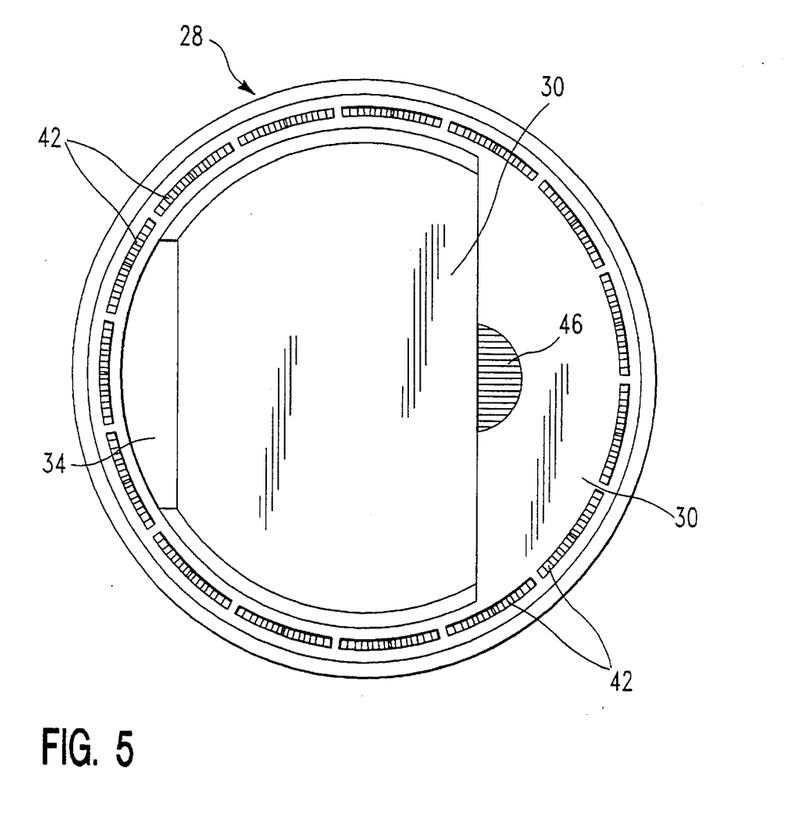
FIG. 5 is a sectional view of the reservoir taken along the section line 5—5 of FIG. 4 and showing a notch formed in the side of the bottom of the reservoir for receiving a protuberance formed on the upper surface of the board to facilitate correct alignment of the reservoir dome and board when attaching them to each other.
Figure 6:
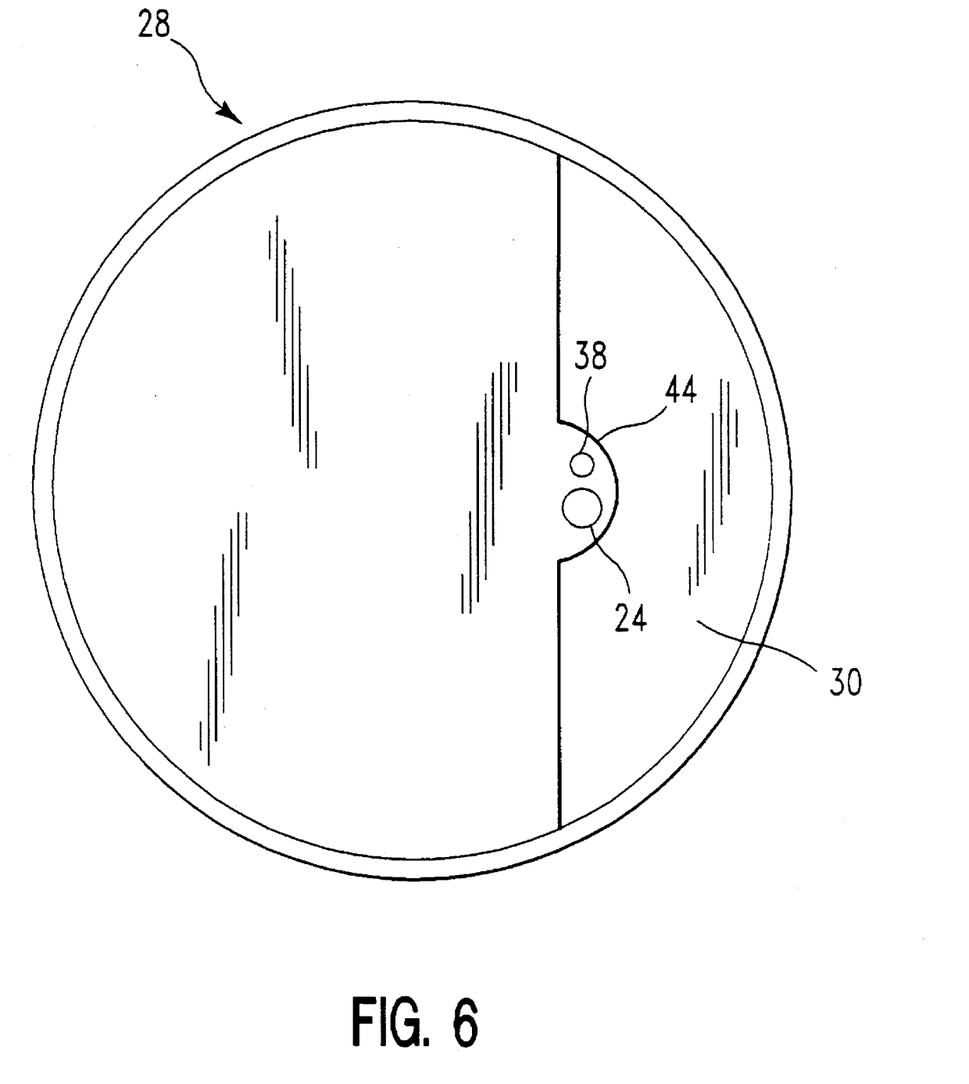
FIG. 6 is a top view of the reservoir of FIG. 4 and showing a nozzle extension in the side of the reservoir dome above the board notch, for collecting water when the reservoir is tilted and for connection to the drain and air tubes.

Dome and board alignment is assured by a notch 44 formed in the external periphery of the bottom of the side of the dome below its point of connection with the drain tube 24, and a protuberance 46 formed in the upper surface of the board 30. (See FIG. 5.) When the protuberance 46 is seated in the notch 44, the extension of the board 30 is disposed so that when the reservoir 28 is placed in a flower pot, it will locate the reservoir to one side of the bottom of the flower pot and so that its drain tube 24 extends over the extension. This maximizes the geometry for effecting drainage with minimum tilt: the drain tube 24 reaches a position wherein its free end is lower than the upper level of the water 36 in the dome 26 of the reservoir even before it is horizontal and long before the tilted-down side 58 of the flower pot would reach below horizontal position and enable possible sliding out of the pot of the soil mass 32 carrying with it the plant 22.

Draining of the reservoir is aided by the formation of a nozzle 48 on its tilt-down side. (See FIGS. 4 and 11.) The nozzle 48 is formed above the notch 44, and is of the same general shape, being semi-cylindrical in cross-section and opening to the reservoir for collecting water of the reservoir as the reservoir is tilted and supplying it to the drain tube 24 to which it is suitably connected as by mounting the inner end of the drain tube into a tightly fitting hole in the top of the extension or onto a spout extending thereabove. The nozzle facilitates getting all of the water out of the reservoir, that is, it minimizes the residual water left in the reservoir and causes the water flow to stop suddenly. The sudden stop inspires the user to stop tilting: thus the risk of losing the soil mass 32 and flower 22 in the flower pot, from careless further tilting, is reduced.

Figure 16:
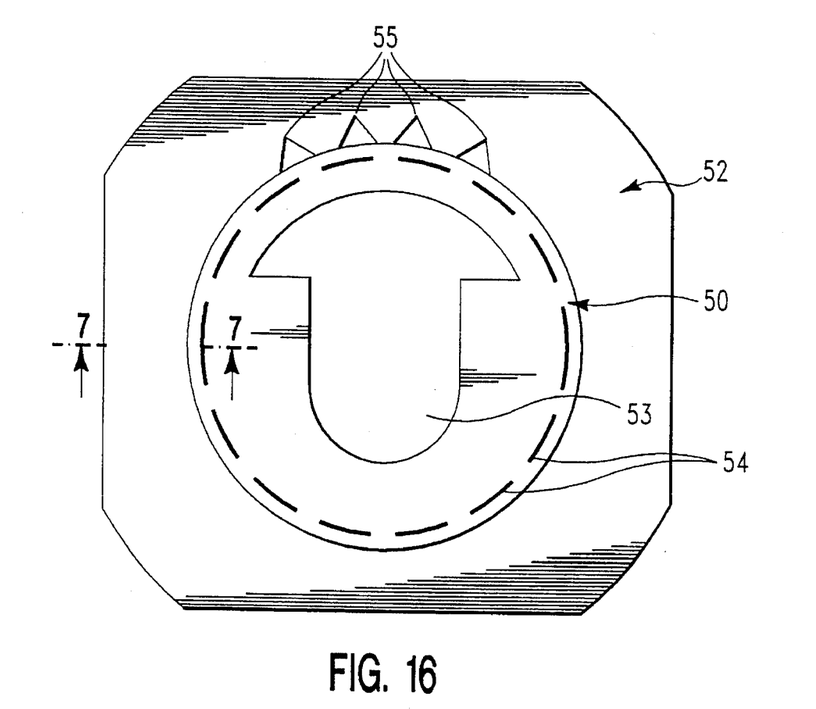
FIG. 16 is a diagrammatic bottom view of the square-shaped template and of the reservoir employed in the non-flat-bottom square-shaped flower pot of FIG. 15 and showing drain holes in the template.

In modifications of the invention, the recessed edge 50 about the bottom peripheral edge of the reservoir board 30 and from which the feet 54 depend, mount either a readily shapeable template 52 (FIGS. 7, 15, and 16) or a springy curved vertical strip 56 (FIGS. 8–10 and 14). To mount the template, the feet 54 are pushed through it. To mount the curved strip 56, its free ends are expanded against its inherent closed bias to embrace the feet 54 on the tilt-down side of the board. The readily shapeable template 52 facilitates use of the reservoir in non-flat-bottom odd-shaped flower pots, where the outer edge of the template tends to form a seal with the sides of the flower pot; because of this, drain-into holes 55 are formed in the tilt-up side of the template (FIG. 16). On the other hand, the curved strip 56 facilitates use of the reservoir in non-flat-bottom round-shaped flower pots, where the bottom edge of the strip forms a seal with the bottom of the flower pot.

Figure 10:
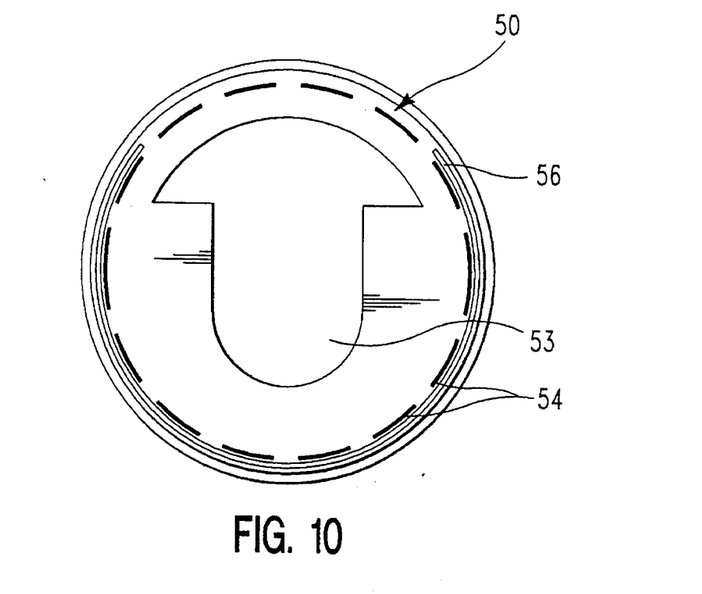
FIG. 10 is a bottom view of the embodiment of FIG. 8 and showing an enlarged opening in the bottom board to allow water in the bottom of a non-flat bottom round-shaped flower pot to flow out the drain tube on tilting.

The template 52 or strip 56 increases the effective reservoir water storage space (flower pot volumes below the reservoir) beyond that of just the dome, and to accommodate the increased volumes because of the template or strip traps and the resultant flow on tilting, the board opening 34 may be enlarged as shown at 53 in FIGS. 10 and 16. When the flower pot is tilted for emptying, some of the water residing beneath the reservoir flows through the hole 53 into the reservoir and with the water in the reservoir flows out through the drain tube 24.

While applicants have shown the invention as retrofit for existing flower pots, it will be evident that the invention can be incorporated into the basic design of a flower pot and the reservoir made integral with it. In the retrofit application, the user would usually purchase a reservoir with the firm board 30 (FIGS. 1–6 and 11–13) designed for a particularly sized and shaped flower pot 20. This purchase may be supplemented with a strip 56 (FIGS. 8–10) or a readily shapeable sheet or template 52 (FIGS. 7 and 16) which is cut to suit. The reservoir would then be placed to one side on the bottom of the flower pot, the water drain and air vent tubes 24 and 38 attached to the dome and led straight to the upper edge of the other side of the pot, and the soil mass or potting material 32 supplied. The tubes are trimmed off at the top edge of the tilt-down side of the pot. Thereafter the plant 22 would have its roots embedded in the soil mass.

The plant 22 would then be watered, that is, have its soil mass 32 wet, usually in one of two ways. In the more carefree and conventional way, the gardener would pour water into the top of the pot 20, the water percolating down through the soil mass. Excess water, on reaching the bottom of the pot, would enter the reservoir dome through its bottom opening 34 in the tilt-up side and collect therein. The gardener after an appropriate amount of time involving among other things the porosity of the soil mass, would tilt the pot in the direction of the drain tube 24 free end to where water flowed out or he was satisfied that no excess water obtained, that being the point at which the drain tube was essentially horizontal and long before the pot tilted-down side 58 reached horizontal and there was a danger of the soil mass sliding out downhill. Thus the continued health of the plant 22 would be assured.

In the alternate watering method, which might be employed to minimize soil compaction due to surface watering, water would be inserted into the drain tube 24 while the pot 20 was in an upright condition. Water would then leave the reservoir through its bottom opening 34 and enter the soil mass 32 from below and wet it by capillary action. The reservoir then serves as a reserve for continued wetting action.

Figure 7:
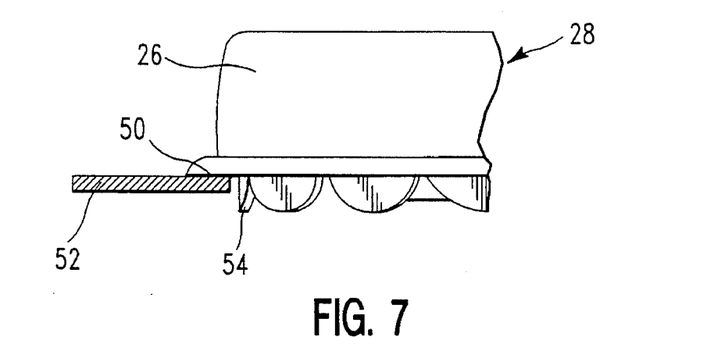
FIG. 7 is a side view of a portion of another embodiment in which the reservoir bottom board with its lower peripheral edge recessed and formed interiorly with feet, attaches a readily-cut sheet or template: this is for non-flat-bottom odd-shaped flower pots.
Figure 8:
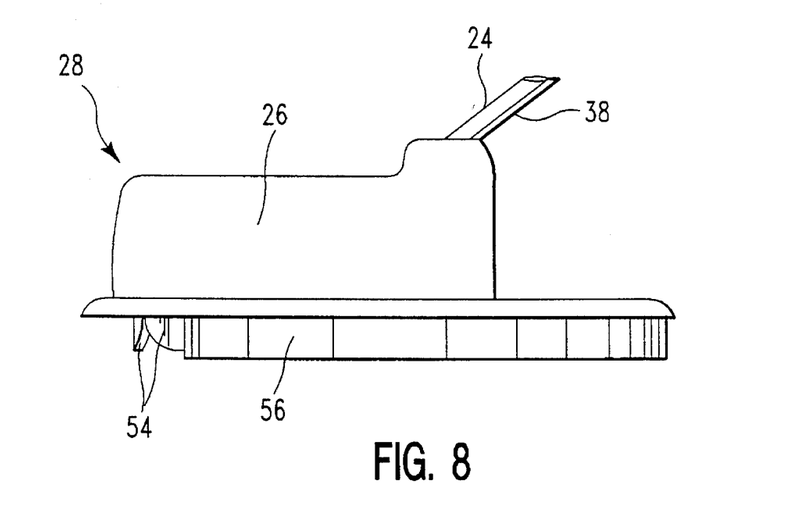
FIG. 8 is a side view of the reservoir of FIG. 7 not using the template but using a springy strip of plastic to cover the outside of the tilt-down feet but not the tilt-up feet next to reservoir bottom opening; this is for non-flat bottom round-shaped flower pots.
Figure 9:
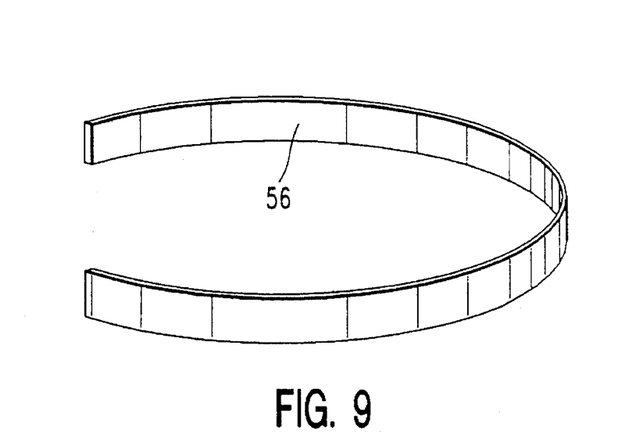
FIG. 9 is a perspective view of the springy strip of plastic of FIG. 8.
Figures 14, 15:
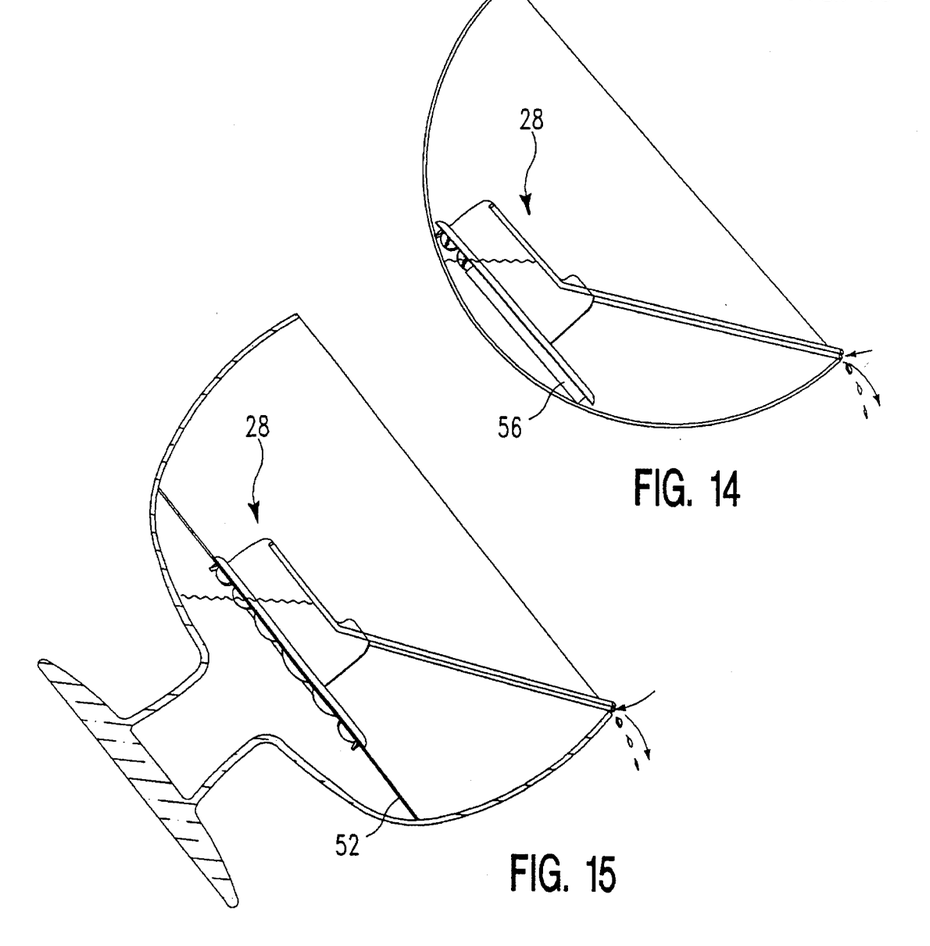
FIG. 14 is a diagrammatic view of a tilted non-flat bottom round-shaped flower pot employing the springy strip of FIGS. 8–10.
FIG. 15 is a diagrammatic view of a tilted non-flat bottom odd-shaped (somewhat square) flower pot employing the template of FIG. 7.

With the embodiment of FIGS. 7, 15 and 16, the template would be first cut to the shape of the bottom of the flower pot. The feet 54 of the board 30 would then be forced through the template 52 after cutting the reservoir bottom opening 53, and the reservoir 28 put in place.

With the embodiment of FIGS. 8–10 and 14, the strip is first placed around the tilt-down feet 54 of the board 30, and the reservoir 28 put in place.

Figure 11:
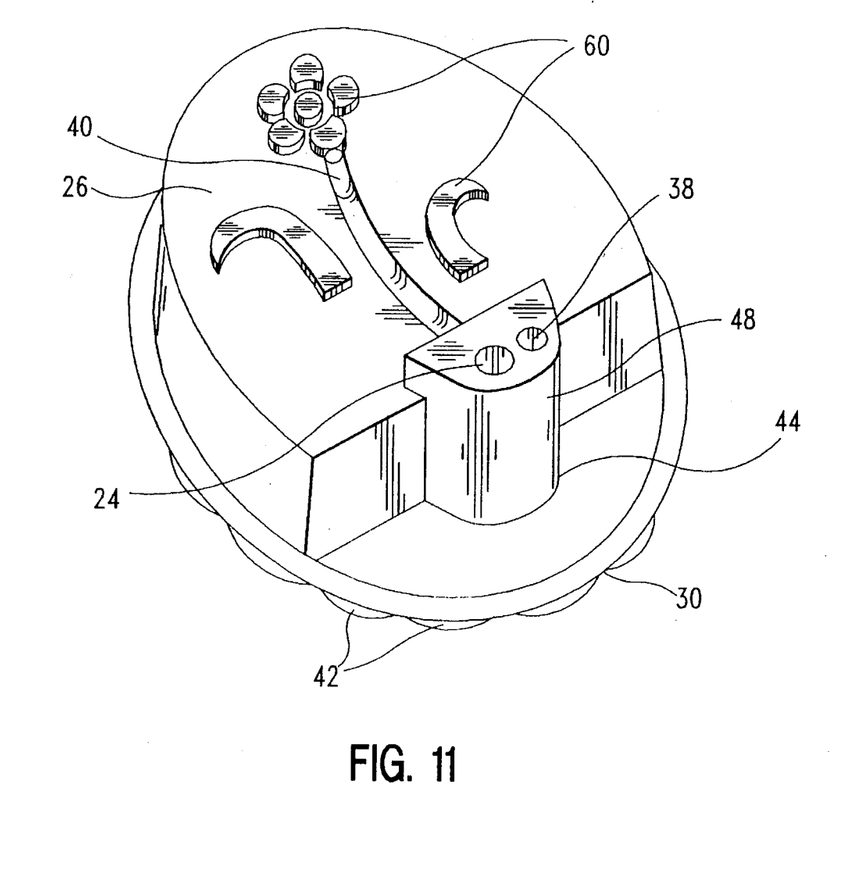
FIG. 11 is a further enlarged diagrammatic view in perspective of the top of the reservoir of FIG. 2.
Figure 12:
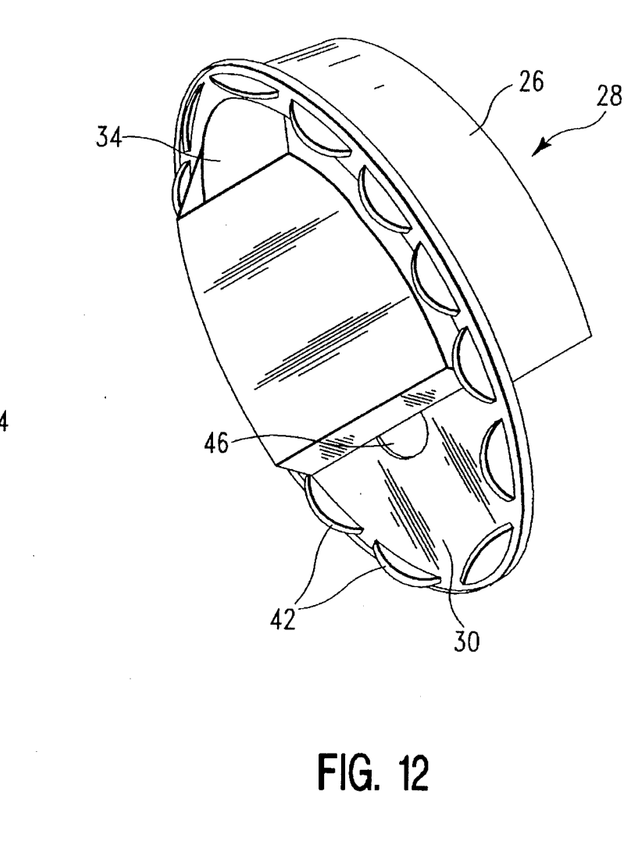
FIG. 12 is a further enlarged diagrammatic view in perspective of the bottom of the reservoir of FIG. 2.

Top and bottom detailed perspectives of the retrofit drainage structure are shown in FIGS. 11 and 12. FIG. 11 further shows embossed floral elements 60 on the dome.

Figure 13:
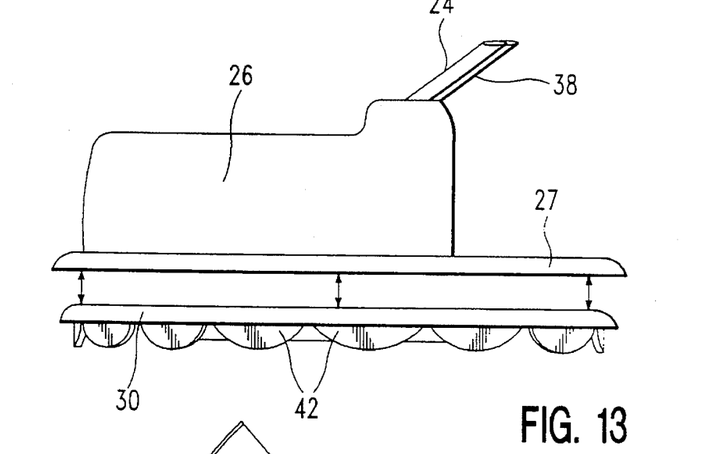
FIG. 13 is an enlarged non-tilted diagrammatic view of the reservoir of FIG. 2 and showing the dome and the board of the reservoir in separated relationship.

As suggested in FIG. 13, the board 30 readily detaches from the dome 26 for cleaning and repair.

While applicants have described their invention with respect to a flower pot, it will be appreciated by those skilled in the art that other and different applications may be made of the principles of the invention. Accordingly, it is intended to be limited only by the spirit and/or scope of the appended claims.

What is claimed is:

1. A flower pot and drainage reservoir comprising in combination
    a flower pot having a bottom with a central axis, and a continuous wall surrounding said bottom with an upper edge and a lower edge secured to said bottom,
    a reservoir provided on said bottom of said flower pot generally to one side of said central axis and having two sides, a first side proximate a first portion of said continuous wall and a second side adjacent said central axis, and
    a tube extending from said second side of said reservoir toward the upper edge of said continuous wall at a location generally opposite said first portion of said continuous wall whereby tilting said flower pot with said first portion of said continuous wall positioned upper most will cause water to drain from said reservoir through said tube.

2. A flower pot and drainage reservoir according to claim 1, wherein the drain tube extends to the upper edge of said continuous wall at a location generally opposite said first portion of said continuous wall of the flower pot.

3. A flower pot and drainage reservoir according to claim 2, wherein the drain tube extends from the top of the second side of the reservoir in a straight line to the upper edge.

4. A flower pot and drainage reservoir according to claim 1, wherein a second tube is connected to the reservoir to admit air thereinto as water is drained from the reservoir on tilting of the flower pot.

5. A flower pot and drainage reservoir according to claim 4, wherein the second tube extends with the drain tube to the upper edge.

6. A flower pot and drainage reservoir according to claim 5, wherein a channel is formed in the upper surface of the reservoir and a portion of the second tube lies therein.

7. A retrofit drainage structure for insertion in a tiltable flower pot having a bottom with a central axis, and a continuous wall surrounding said bottom with an upper edge and a lower edge secured to said bottom, comprising a reservoir having two sides, a first side for placement proximate a first portion of said continuous wall and a second side for placement adjacent said central axis, means for holding the reservoir generally on one side in the bottom of a flower pot, and a tube for extending from the second side of the reservoir toward the upper edge of said continuous wall at a location generally opposite said first portion of said continuous wall whereby tilting said flower pot with said first portion of said continuous wall positioned upper most would cause water to drain from said reservoir through said tube.

8. A retrofit drainage structure according to claim 7, wherein the means for holding the reservoir on one side in the bottom of a flower pot is a generally flat piece that extends beyond the second side of the reservoir.

9. A retrofit drainage structure according to claim 8, wherein the flat piece generally extends across the bottom of the reservoir and closes it off on second side for holding water within the reservoir on tilting of the flower pot while admitting water into the reservoir elsewhere.

10. A retrofit drainage structure according to claim 8, wherein the flat piece is readily attachable to the reservoir and detachable from the reservoir for ease of cleaning and repair.

11. A retrofit drainage structure according to claim 8, wherein the flat piece is formed with protuberances or feet on its bottom surface to facilitate water flow beneath it to the reservoir on excessive watering.

12. A retrofit drainage structure according to claim 8, wherein the flat piece provides an opening in the bottom of the reservoir on the first side of the reservoir to be near said first portion of said continuous wall at the bottom of the flower pot for the entrance of excess water into the reservoir.

13. A retrofit drainage structure according to claim 8, wherein the flat piece is a board formed with a projection which fits into the bottom of the nozzle extension for accurately aligning the board with the reservoir.

14. A retrofit drainage structure according to claim 7, wherein the second side of the reservoir is generally a vertical wall centrally projecting laterally a nozzle extension for collecting water in the reservoir on tilting and deliverance to the drainage tube.

15. A retrofit drainage structure according to claim 8, wherein the perimeter of the flat piece is formed with proturberances or feet for supporting the reservoir in spaced relationship to the bottom of a flower pot.

16. A retrofit drainage structure according to claim 15, wherein the perimeter of the flat piece is cut away to form a recessed edge and the feet depend from inside the edge.

17. A retrofit drainage structure according to claim 16, wherein the feet depend through a template that generally extends beyond the sides of the reservoir.

18. A retrofit drainage structure according to claim 16, wherein the feet on the second side of the reservoir are covered with a strip of impermeable material.

19. A retrofit drainage structure according to claim 7, wherein the drain tube is of a length to extend to the the upper edge of said continuous wall at a location generally opposite said first portion of said continuous wall of the flower pot.

20. A retrofit drainage structure according to claim 19, wherein the drain tube is capable of extending from the top of the side of the reservoir in a straight line to the upper edge.

21. A retrofit drainage structure according to claim 7, wherein a second tube is connected to the reservoir for admitting air thereinto as water is drained from the reservoir on tilting of the flower pot.

22. A retrofit drainage structure according to claim 21, wherein the second tube is capable of extending with the drain tube to the upper edge.

23. A retrofit drainage structure according to claim 22, wherein a channel is formed in the upper surface of the reservoir and a portion of the second tube lies therein.

24. A retrofit drainage structure according to claim 17, wherein the template has drain-into holes for passing water beneath it.

25. A retrofit drainage structure according to 16, wherein the flat piece includes a large hole for passing water from below the structure into the reservoir for drainage when employed with a template or springy strip.

26. A retrofit drainage structure according to claim 8, wherein the reservoir includes a dome that has a lateral extension on its bottom edge which overlies the flat-piece extension.

* * * * *